United States Patent
Pettigiani et al.

(10) Patent No.: US 10,788,005 B2
(45) Date of Patent: Sep. 29, 2020

(54) SYSTEM FOR CONTROLLING AN INTERNAL COMBUSTION ENGINE

(71) Applicant: FPT Industrial S.P.A., Turin (IT)

(72) Inventors: Alberto Pettigiani, Chiusa di San Michele (IT); Agostino Gnasso, Caselle Torinese (IT); Damiano Bussei, Florence (IT); Orazio Fiume, Monopoli (IT)

(73) Assignee: FPT INDUSTRIAL S.p.A., Turin (IT)

( * ) Notice: Subject to any disclaimer, the term of this patent is extended or adjusted under 35 U.S.C. 154(b) by 322 days.

(21) Appl. No.: 14/425,369

(22) PCT Filed: Sep. 5, 2013

(86) PCT No.: PCT/EP2013/068345
§ 371 (c)(1),
(2) Date: Mar. 3, 2015

(87) PCT Pub. No.: WO2014/037430
PCT Pub. Date: Mar. 13, 2014

(65) Prior Publication Data
US 2015/0219057 A1    Aug. 6, 2015

(30) Foreign Application Priority Data

Sep. 5, 2012  (EP) .................... 12183089

(51) Int. Cl.
*F02N 11/08* (2006.01)
*F02D 28/00* (2006.01)
(Continued)

(52) U.S. Cl.
CPC .......... *F02N 11/0829* (2013.01); *F02D 28/00* (2013.01); *F02D 41/22* (2013.01);
(Continued)

(58) Field of Classification Search
CPC ............. F02N 11/0814; F02N 11/0818; F02N 11/0829; F02D 41/08; F02D 41/2441; F02D 41/2451; Y02T 10/48
(Continued)

(56) References Cited

U.S. PATENT DOCUMENTS 6,009,371 A * 12/1999 Kobayashi ............. B60K 6/445
                                                        123/339.19
6,308,129 B1 * 10/2001 Uchida ................... F02D 17/04
                                                        477/203
(Continued)

FOREIGN PATENT DOCUMENTS

DE    102006016818    10/2007
EP         1647707 A1 *  4/2006  ............ B60K 28/12
(Continued)

OTHER PUBLICATIONS

Office Action relating to corresponding Japanese Patent Application No. 2015-530382; dated Aug. 29, 2018, 7 pages.*
(Continued)

*Primary Examiner* — John M Zaleskas
(74) *Attorney, Agent, or Firm* — Stetina Brunda Garred and Brucker

(57) ABSTRACT

System for controlling an internal combustion engine, the system comprising stop means to stop automatically an internal combustion engine according to a predefined operating condition of the internal combustion engine, verification and/or restoration means to verify or to restore a first component of the internal combustion engine, learning means to learn a control variable of a second component of the internal combustion engine, inhibition means of the stop means to prevent/ignore an engine stop, wherein only the verification and/or restoration means, when activated, are suitable to cause an activation of the inhibition means, and (Continued)

wherein the learning means are enabled to activate only when the verification and/or restoration means are active.

19 Claims, 3 Drawing Sheets

(51) Int. Cl.
F02D 41/22 (2006.01)
F02D 41/24 (2006.01)
F02D 41/02 (2006.01)
(52) U.S. Cl.
CPC ........ *F02D 41/2441* (2013.01); *F02D 41/029* (2013.01); *F02N 2200/0806* (2013.01); *F02N 2200/0814* (2013.01); *Y02T 10/40* (2013.01)
(58) Field of Classification Search
USPC ........................................ 701/112; 123/179.4
See application file for complete search history.

(56) References Cited

U.S. PATENT DOCUMENTS

| | | | | | |
|---|---|---|---|---|---|
| 8,606,485 | B1 * | 12/2013 | Ando | .................... | B60W 10/06 701/102 |
| 2004/0015285 | A1 * | 1/2004 | Mitsutani | .............. | F02D 31/003 701/101 |
| 2004/0084002 | A1 * | 5/2004 | Mitsutani | .............. | F02D 41/021 123/179.4 |
| 2007/0207888 | A1 * | 9/2007 | Zell | .................... | F02D 41/1402 475/204 |
| 2007/0240916 | A1 * | 10/2007 | Zell | ...................... | F02D 41/042 180/7.1 |
| 2008/0275626 | A1 * | 11/2008 | Ando | ...................... | B60K 6/365 701/106 |
| 2009/0005924 | A1 * | 1/2009 | Hasegawa | .............. | B60K 6/445 701/22 |
| 2009/0314255 | A1 * | 12/2009 | Boesch | .................. | B60K 6/365 123/339.24 |
| 2009/0319109 | A1 * | 12/2009 | Ando | ....................... | B60K 1/02 701/22 |
| 2009/0319158 | A1 * | 12/2009 | Ando | ....................... | B60K 1/02 701/106 |
| 2009/0319161 | A1 * | 12/2009 | Abendroth | .......... | F02N 11/0818 701/112 |
| 2010/0094526 | A1 * | 4/2010 | Ando | ...................... | F02D 29/02 701/103 |
| 2011/0100326 | A1 * | 5/2011 | Yoshida | ................ | F02D 11/105 123/337 |
| 2011/0118951 | A1 * | 5/2011 | Watanabe | .............. | B60K 6/445 701/101 |
| 2013/0311061 | A1 * | 11/2013 | Ando | .................... | B60W 10/06 701/102 |

FOREIGN PATENT DOCUMENTS

| | | | | | |
|---|---|---|---|---|---|
| EP | | 2146077 | A1 * | 1/2010 | ......... F02D 41/0002 |
| JP | | 2004003514 | A * | 1/2004 | ......... F02D 41/2429 |
| JP | | 2005325794 | A * | 11/2005 | ......... F02N 11/0829 |
| JP | | 2007071178 | A * | 3/2007 | |
| JP | | 2007-127133 | | 5/2007 | |
| JP | | 2008303788 | A * | 12/2008 | |
| JP | | 2009274553 | | 11/2009 | |
| JP | | 2010265867 | | 11/2010 | |
| JP | | 2010265867 | A * | 11/2010 | ......... F02D 41/2441 |
| JP | | 2011196187 | A * | 10/2011 | |
| JP | | 2011208588 | A * | 10/2011 | |
| JP | WO 2012039029 | A1 * | 3/2012 | ............ B60W 10/06 |
| WO | WO 2007017323 | A1 * | 2/2007 | .......... F02D 41/029 |
| WO | WO2012039029 | | 3/2012 | |

OTHER PUBLICATIONS

Office Action relating to corresponding Japanese Patent Application No. 2015-530382; dated Dec. 1, 2017, 3 pages.

* cited by examiner

SYSTEM FOR CONTROLLING AN INTERNAL COMBUSTION ENGINE

CROSS REFERENCE TO RELATED APPLICATIONS

The present application claims priority to PCT International Application No. PCT/EP2013/068345 filed on Sep. 5, 2013, which application claims priority to European Patent Application No. 12183089.7 filed Sep. 5, 2012, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of the systems for controlling internal combustion engines, in particular equipped with automatic stop means, and more precisely to the systems for managing the devices and their respective functionalities requiring an inhibition of said stop means.

DESCRIPTION OF THE PRIOR ART

Learning processes performed by systems for controlling the components of the internal combustion engines are known in the art. One of the most known relates to the adjustment of the intake throttle valve of internal combustion engines.

Other learning processes may relate to the adjustment of the control sensors of the engine.

Learning processes may be necessary not only to keep such sensors under control, but also to use the same sensors and the same control systems for different components and layouts, so that they can automatically adapt to the context wherein they are applied, without having to previously store control parameters into the control systems.

An example of such practice is connected to the use of the same engine on vehicles whose intake pipes have different layouts. Thus, at least one learning process has to be performed in order to adjust the air mass measurer according to characteristics of such layout.

In general the learning processes are performed in loadless and idle conditions, namely with the engine running at its minimum speed (M), namely between 600 and 1200 rpm, and without load.

In vehicles equipped with an automatic stop of the internal combustion engine, namely vehicles equipped with a Stop&Start system or hybrid vehicles, the combustion engine works very rarely in a loadless and idle condition.

Such operating condition, when no process alters the air/fuel mixture and thus the exhaust gas mixture, is considered as an ideal learning condition.

In general, according to the engine managing processes of vehicles equipped with Stop&Start system or of hybrid vehicles, the engine has to be stopped in such ideal learning condition. Thus the learning processes cannot be performed.

EP0908619 describes a solution according to which the engine stop is inhibited if a learning process is being performed.

Other non-learning processes that inhibit the internal combustion engine stop when running in idle are known in the art.

According to some of them, the engine may run in idle (M) without load or with a moderate load, namely with a moderate resistance torque with respect to the maximum torque of the engine.

Others of them may absorb different power from the internal combustion engine in relation to predetermined conditions, without affecting the engine revolutions per minute, namely its speed in idle (M).

Others of them may determine variations of the composition of the exhaust gas mixture without absorbing torque from the internal combustion engine.

The succession of all these processes inhibiting the engine stop tends to increase the engine fuel consumption.

SUMMARY OF THE INVENTION

Thus the aim of the present invention is to overcome the aforementioned drawbacks and to provide a control system for an internal combustion engine equipped with automatic stop means, learning means, verification and/or restoration means and means for inhibiting the stop.

The idea at the basis of the present invention is to parallelize at least a learning process with at least a non-learning process, namely a verification and/or restoration process, in order to optimize the fuel saving of the internal combustion engine. In particular, according to the idea, only the at least one verification and/or restoration process can provoke the inhibition of the internal combustion engine stop.

Thus, according to the present invention, the learning processes are not able to cause the inhibition of the engine stop. Among these non-learning processes, at least one is suitable to cause the enabling/interruption of the running of at least a learning process.

Thus a learning process may be performed only while at least one non-learning process causes the inhibition of the internal combustion engine stop. Such stop may intervene when the engine runs in loadless and idle conditions.

The object of the present invention is also a control system of an internal combustion engine, in accordance with claim 1.

In particular, the object of the present invention is an internal combustion engine comprising the control system described above.

According to the present description, the processes that are considered as non-learning, namely the verification and/or restoration processes suitable to the present aims, are those processes that inhibit the engine stop without substantially altering the engine speed with respect to the idle condition. Such non-learning processes include, for example:

verification of the activation of a vehicle air-conditioner, in particular the compressor of the air-conditioner restoration of a particulate filter, verification of the activation of a compressor for compressed air, generally in heavy vehicles.

restoration of a drying cartridge of a compressor for compressed air, verification of the activation of recharging means for vehicle batteries, verification of the efficiency of the recharging system for vehicle batteries, verification of an activation of a warm-up process of an exhaust line, to make it work properly, verification of an activation of a warm-up process of an internal combustion engine, to make it work properly, verification of the opening of the engine bonnet, in order to avoid the engine stop to interfere with maintenance operations;

verification of the efficiency of the electric propulsion systems, when the vehicle is hybrid.

Such processes, due to the possible torque absorbed by the heat engine, or due to the alterations introduced by a control parameter of the heat engine, may alter the ideal learning condition, even though they do not alter the engine speed in idle.

In general, the altered parameter relates to the fuel supply to the engine, but other parameters may be altered.

The opening of the engine bonnet, for example, does not alter in any way the ideal learning conditions, since it does not absorb engine torque and it does not alter the engine speed in idle. Thus the opening of the bonnet may enable any learning process to be performed in idle.

Some of such non-learning processes absorb a modest and negligible torque from the heat engine with respect to its maximum torque, such as for example the activation of the compressor of the air-conditioner. Since some learning processes may be not affected, within certain limits, by the effect of such torque absorption, they can be enabled during the running of such non-learning processes/devices that absorb torque from the heat engine.

Other non-learning processes may do not absorb any torque, but determine a variation of the exhaust gas mixture, such as for example the engine or the exhaust line heating process, or the regeneration process of the particulate filter. Since some learning process may be not affected, within certain limits, by the effect of such variation of the exhaust gas mixture, such learning processes can be enabled during the running of such non-learning processes.

Other non-learning processes may absorb a variable and controllable torque from the engine, such as for example the recharging process of the vehicle batteries.

According to a first preferred embodiment of the invention, such non-learning processes that absorb a variable torque from the internal combustion engine are controlled in order to lower the required torque below a predetermined torque value, until a learning process, not affected by the effect of such absorption below said predefined torque value, is running. For example, the electric generator may be controlled in order to favour the learning conditions.

Some non-learning processes that imply a variation of an engine control parameter may be controlled, others, on the contrary, are fixed.

According to an alternative embodiment of the present invention, the processes that alter an engine control parameter, for example, the fuel supply, may be dampened/levelled so that the exhaust gas mixture is not altered beyond a predetermined ratio between the gas components, until a learning process, not affected by the effect of such alteration within said predetermined ratio, is running.

According to an alternative embodiment of the present invention, a learning process, in relation to the non-learning process running, is suitable to take into account a possible alteration introduced by such non-learning process on said control parameter with respect to an ideal learning process. Thus, being a variation of the engine control parameter and/or of a torque absorbed from the engine, if such variation affects the learning process, the latter takes it into account, with specific reference to the type of noise introduced by the non-learning process.

According to an alternative embodiment of the present invention, the activation of a non-learning process determines the enabling of a learning process. The latter may be forced to be activated when enabled, or it may be activated only if needed.

According to another alternative embodiment of the invention, a learning process is activated only after having detected the activation of at least a non-learning process.

Advantageously, it is no longer necessary to keep the engine in idle and loadless until a learning process is running. This determines a remarkable fuel saving.

Moreover, given the high number of non-learning processes that cyclically inhibit the stop of the heat engine, it is irrelevant that a learning process is stopped in advance because of the end of a non-learning process.

The present invention can be applied both to vehicles equipped with Stop&Start systems and to hybrid vehicles, having a configuration in series or in parallel.

From the list, given by way of example, of the non-learning processes, it can be understood that such processes may be defined as processes to verify or to restore a functionality of the engine, or more in general, of the vehicle. Thus, for the present purposes and without losing generality, such non-learning processes may be defined as verification and/or restoration processes, including all non-learning processes.

In the following, the control variable refers to the at least one variable learned during a learning process. While the control parameter refers to a pre-stored parameter or to a parameter calculated in real time.

In the scope of the present description it is relevant to distinguish between "enabled" and "activated", since "enabled" represents a condition that is necessary but is not sufficient for the activation, while the activation implies the enabling of a device/process.

The claims are an integral part of the present description.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which.

In the figures the same reference numbers and letters identify the same elements or components.

DETAILED DESCRIPTION OF PREFERRED EMBODIMENTS OF THE INVENTION

In the following, a description of the system that is object of the invention is provided, such system allowing the actuation of a learning process in parallel with a non-learning process which inhibits the heat engine stop without altering the speed of rotation of the engine, namely keeping it in idle.

Figure 1:
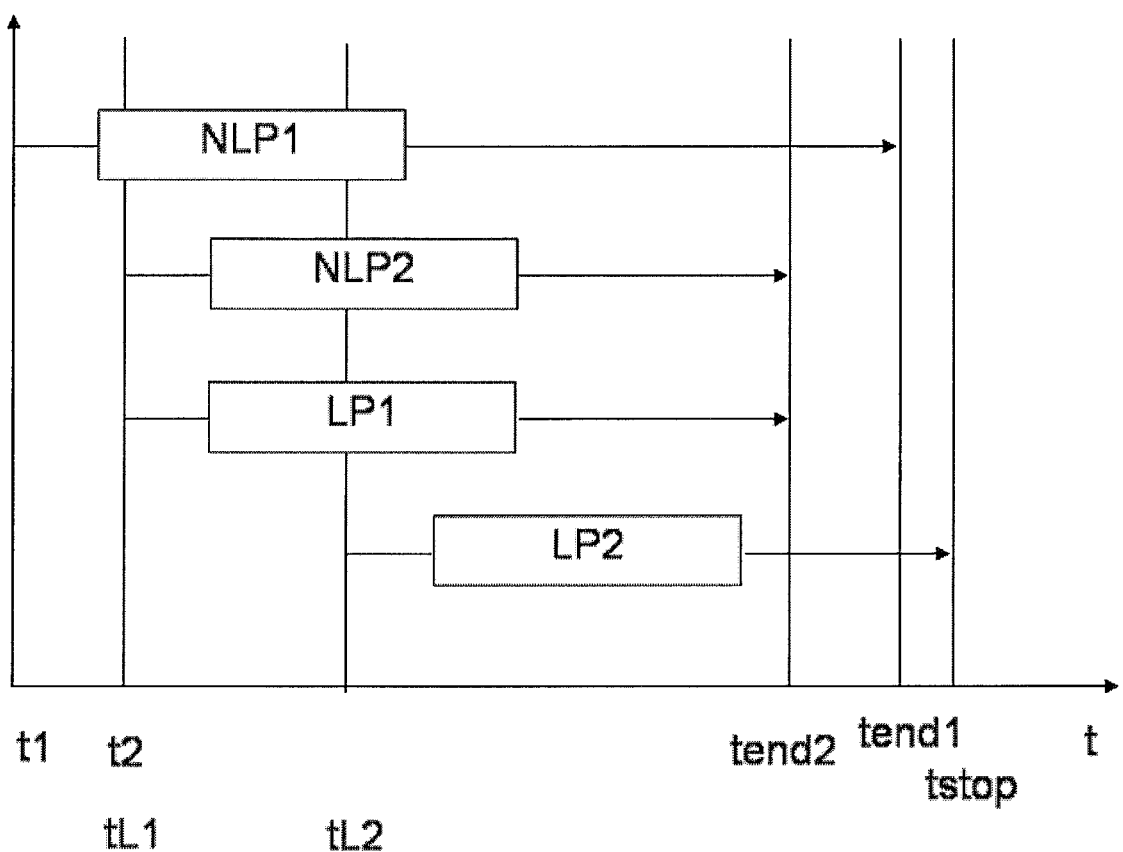
FIG. 1 shows a time diagram illustrating the management, according to the present invention, of the active processes/devices during the operation of an internal combustion engine.

With reference to FIG. 1, which shows a time diagram, at instant t1 a first non learning process NLP1 starts. This enables the processing of at least a learning process, but in such instant t1 no learning process is necessary.

At the instant t2, subsequent to t1, a second non-learning process NLP2 starts. At the instant tL1, for example coinciding with t2, a first learning process LP1 of a value of a control variable of an engine component has to start. Such learning process LP1 can start, since the engine stop is inhibited by at least a non-learning process.

At the instant tL2, subsequent to HA, a second learning process LP2 of a value of another control variable of an engine component has to start. Such learning process LP2 can start, since the engine stop is inhibited by at least a non-learning process.

At the instant tend2, the second non-learning process and the first learning process LP1 have completed their respective operations and end.

The second learning process LP2 continues, since it has not completed yet its operations, and it can continue since there is at least a non learning process that inhibits the engine stop.

At the instant tend1, the first non-learning process has finished its operations and ends, determining the end of the inhibition of the stop means. At the instant tstop, the stop means determine the engine stop, thus the second learning process ends.

According to the present invention, when only one of the non-learning process is associated to the enabling of at least a learning process, then said at least one non-learning process NLPx may inhibit the activation of another non-learning process NLP1-NLPx−1, NLPx+1-NLPn that may interfere with such learning process. This happens because, as it will be clear in the following, such enabled learning process may be incompatible with other non-learning processes.

Figure 2:
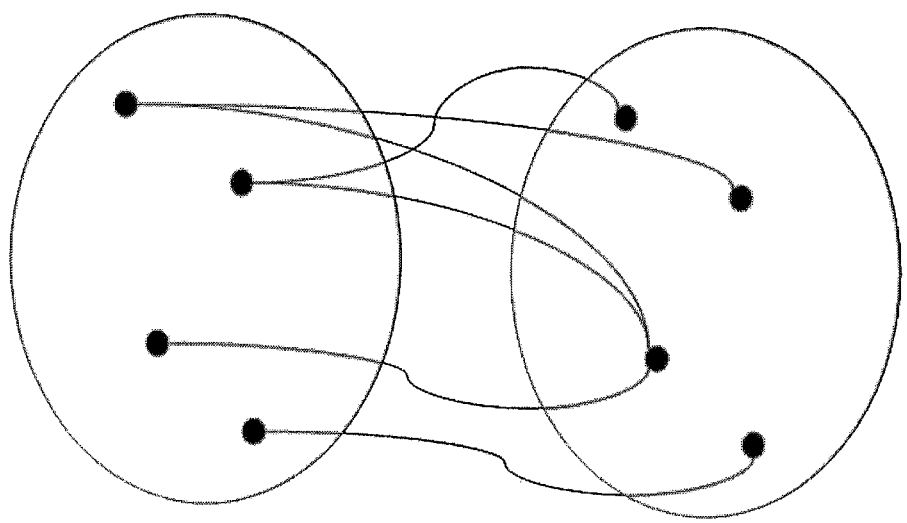
FIG. 2 shows in outline the relations between the active processes of FIG. 1.

If two sets are considered, as shown in FIG. 2, a first set is representative of the non-learning processes NLP and the second set is representative of the learning processes LP. Among the elements of the two sets it is possible to identify some relations.

For example, the absorption of any torque from the engine may determine an engine operating condition that is incompatible with a specific learning process. Such specific learning process, on the contrary, may be unaffected by a process that is performed in idle (speed M) and at the same time enriches the mixture air/fuel and/or performs simultaneous fuel post-injections for restoring the particulate filter. Thus, such learning process may be run in parallel with a process that comprises a variation of the exhaust gas mixture, the latter being a function of the air/fuel supply mixture. In the latter case, a compatibility relation is established between a non-learning process and a learning process.

According to the present invention, the compatibility relations between the learning processes and the non-learning processes are stored in the control system that is object of the present invention, which enables the learning processes that are compatible with the non-learning processes that are being performed. Subsequently, in relation to the need of performing a learning process, the enabled learning process may be or may not be activated.

There may be learning processes, within certain limits, that are not affected by both a torque absorption and a variation of the engine air/fuel supply. Thus relations may be defined between the two sets in order to enable, consequently, the learning processes that are compatible with such conditions. The latter may be forced to be run or they may be run only if necessary.

FIG. 2 considers all the possible relations, known from the set theory and clear to the person skilled in the art.

The running of a learning process may also be subject to the verification of determined conditions.

For example, for an adjustment operation of the sensor measuring the air mass, the respective learning process may be subject to the following conditions:
no errors from the air mass sensor;
ambient temperature within a specific interval;
engine temperature within a specific interval;
regenerative process not active;
no water infiltrations in the sensor
atmospheric pressure exceeding a predefined value.

From the analysis of such conditions, it can be understood that such learning process is affected by the fuel supply to the engine, but is not affected by the absorption of a modest torque.

It can be performed without any particular precaution when, for example, the compressor of the air conditioner inhibits the stop of the heat engine. In fact, especially for the heat engines having a remarkable power, the power/torque absorbed by the compressor of the air-conditioner is substantially irrelevant.

According to another example, such learning process may be performed when the process of battery recharging is being performed, such process being a non-learning, variable-torque and controllable process.

In general, the electric generator absorbs a torque that is inversely proportional to the charge status of the batteries. According to a preferred alternative embodiment of the present invention, when a learning process is being performed, such torque absorption may also be limited to a predetermined value, until the learning process is being performed.

Figure 3:
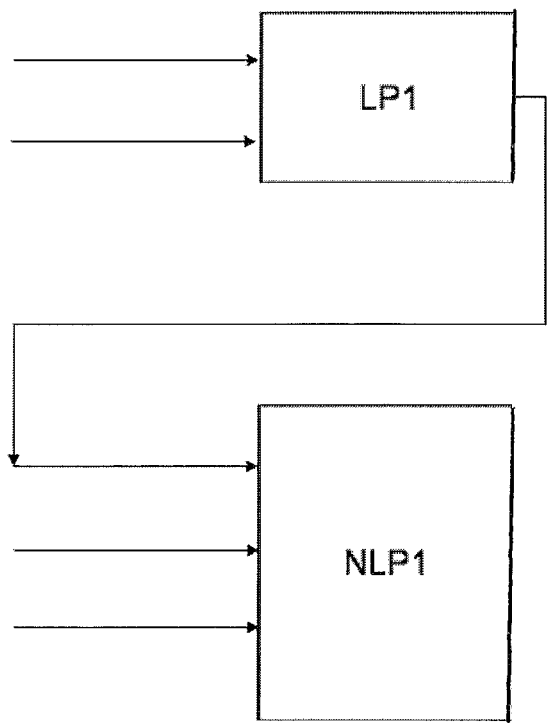
FIGS. 3 and 4 indicate examples on interactions between processes in reciprocal relation among the ones indicated in FIG. 2.

At the end of the learning process, such torque/power limitation ends. After that, at the end of the battery recharging, the recharging process ends the inhibition of the internal combustion engine stop. Such example may be understood also with the help of the diagram of FIG. 3, which shows that a verification and/or restoration block/process NLP1 comprises, among the possible normal inputs, an input connected to an output of a learning block/process LP1, by means of which it can control said of limitation torque absorption from the heat engine. Such solution may be applied also to those non-learning processes that modify an engine supply parameter in a controllable way.

As an alternative, a learning process may monitor the torque absorption by the generator and be activated when such torque value drops below a predetermined value.

According to another preferred alternative embodiment of the invention, when the vehicle is started, the efficiency of the battery recharging is verified on the battery recharging system. The generator, or its voltage regulator, may not work properly. Thus such verification process monitors the voltage level of the batteries for a predefined interval of time.

Within such interval of time, a learning process may be allocated and run without altering the usual operations of the vehicle.

According to a further preferred alternative embodiment of the invention, when the vehicle is hybrid, at the vehicle start, the efficiency of the electric propulsion is verified: at least the motor or the motor-generator and/or the inverter controlling the motor are verified. Such verification implies an inhibition of the heat engine stop.

Within such interval of time that is necessary for such verification, a learning process may be allocated and run without altering the usual operations of the vehicle.

In other words, according to the present invention, the learning processes are transparent to the usual policies managing the heat engine stop and the inhibition of such stop due to non-learning processes.

The various verification and/or restoration processes described above may be managed by respective devices or by processes or threads running on one or more control units, such as for example the ECU.

According to a preferred alternative embodiment of the invention, a verification and/or restoration process positively enables the performance of a learning process.

According to another preferred alternative embodiment of the invention, the learning process itself monitors the status of the verification and/or restoration processes and activates when at least one of them is active.

According to a further aspect of the invention, the activation of a verification and/or restoration process may represent, as said above, a noise with respect to an ideal learning condition. In relation to the type of the verification and/or restoration process at least its respective altered control parameter and the entity of the alteration are known. For example the amount of post-injected fuel in order to obtain the particulate filter regeneration is known. Such altered parameter may receive a feedback in a learning process/device LP in order to compensate such noise in the learning process. In other words, by making the latter immune to such noise.

Figure 4:
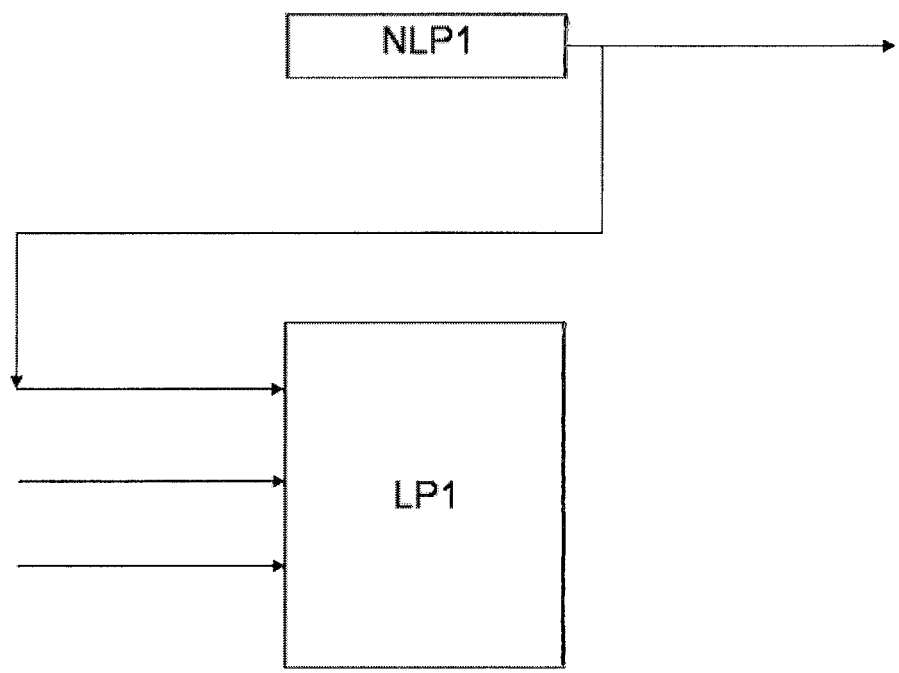
Figure 5:
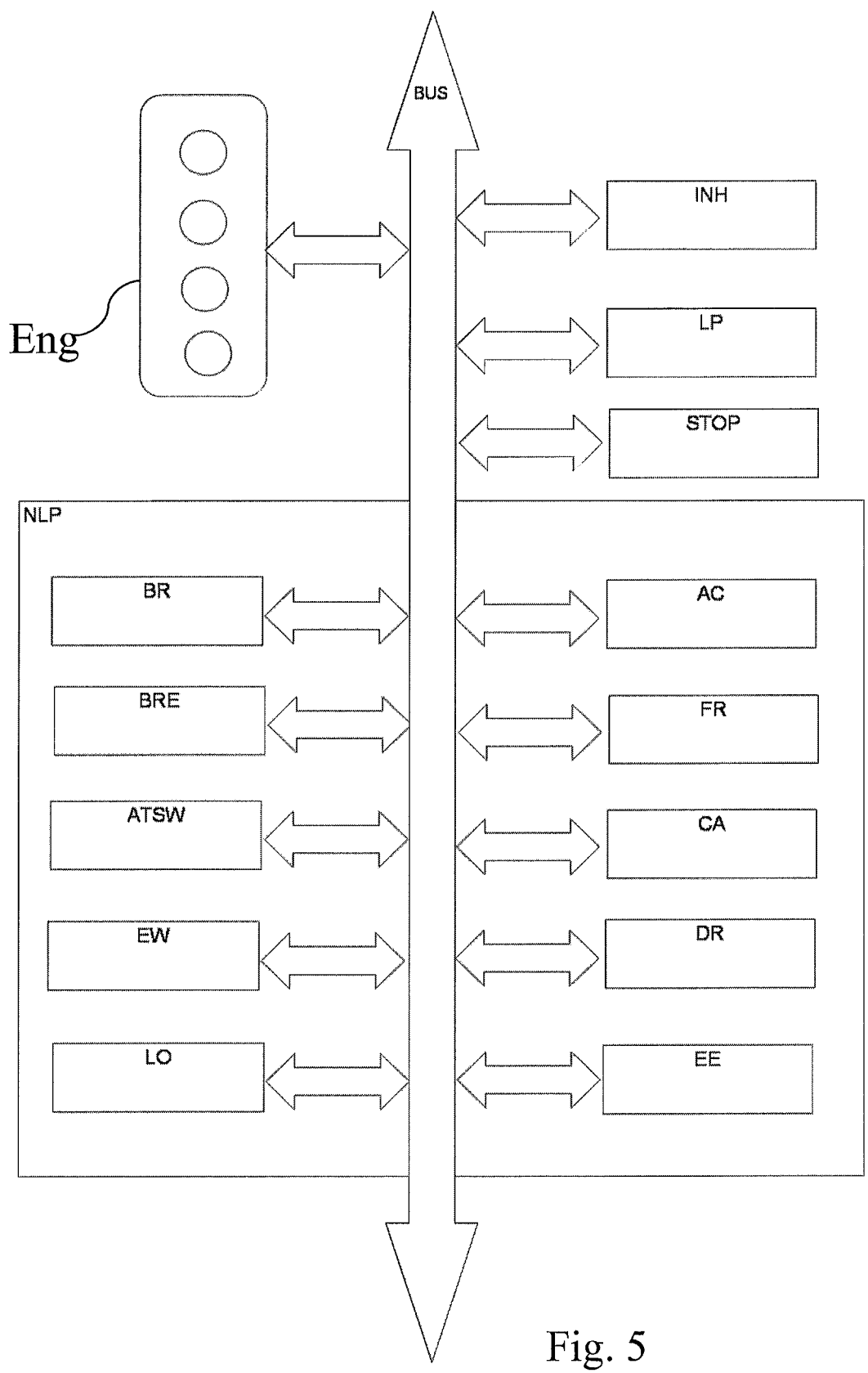
FIG. 5 shows a functional diagram of the components defining and/or interacting with the system according to the present invention.

An illustrative diagram is shown in FIG. 4. The verification and/or restoration process NLP1 alters an engine control parameter. Such parameter is proportional to a value of the output of the block NLP1. The learning process LP1 comprises at least an input that is proportional to such output of the block NLP1.

According to a further aspect of the invention, the interval of time of the inhibition of the heat engine stop can be estimated according to the verification and/or restoration process. Thus, if such interval is sufficient for (higher or equal to) the performance of a learning process, such learning process is enabled and/or activated, otherwise it is disabled and this deactivated.

From the description set forth above it will be possible for the person skilled in the art to embody the invention with no need of describing further construction details. The elements and the characteristics described in the different preferred embodiments may be combined without departing from the scope of the present application.

The present invention may advantageously be realized by means of a computer program, which comprises program code means performing one or more steps of said method, when said program is run on a computer. For this reason the scope of the present patent is meant to cover also said computer program and the computer-readable means that comprise a recorded message, such computer-readable means comprising the program code means for performing one or more steps of such method, when such program is run on a computer.

The invention claimed is:

1. A control method of an internal combustion engine (Eng), the method comprising:
   detecting whether a first condition is true, the first condition being that a process is being performed from among one or more verification and/or restoration processes, whose being performed inhibits an automatic stop of the internal combustion engine independently of an outcome of the same verification and/or restoration process; and
   providing a computer programmed to learn a control variable of a component of said internal combustion engine only while the first condition is true such that the learning of the control variable is only performed while the first condition is true and the automatic stop of the internal combustion engine is thus inhibited;
   wherein the one or more verification and/or restoration processes are selected from the group consisting of:
      verification of the activation of a vehicle air conditioner (AC),
      restoration of a particulate filter (FR),
      verification of the activation of a compressor for compressed air (CA),
      restoration of a drying cartridge of a compressor for compressed air (DR),
      verification of the activation of recharging means for vehicle batteries (BR),
      verification of the efficiency of a recharging system for vehicle batteries (BRE),
      verification of the activation of a warm up process of an exhaust line (ATSW),
      verification of the activation of a warm up process of the internal combustion engine (EW),
      verification of the opening of an engine bonnet (LO), and
      verification of the efficiency of electric propulsion systems (EE).

2. The control method according to claim 1, wherein the learning of the control variable is on a necessary condition that a second condition is true, the second condition being that the process has a running time greater than a running time of the learning of the control variable.

3. The control method according to claim 2, wherein the learning of the control variable is on a sufficient condition that the second condition is true.

4. The control method according to claim 2, wherein the learning of the control variable is on a further necessary condition that it is necessary to learn said control variable.

5. The control method according to claim 1, wherein the learning of the control variable is on a necessary condition that a second condition is true, the second condition being that the process includes absorbing a torque from the internal combustion engine within a predefined limit.

6. The control method according to claim 1, wherein the learning of the control variable is on a necessary condition that a second condition is true, the second condition being that the process includes introducing a variation fixed to a control parameter of the internal combustion engine within a predefined limit.

7. The control method according to claim 1, wherein the learning of the control variable includes limiting a torque absorbed by the internal combustion engine and/or a variation of a control parameter of the internal combustion engine introduced by the process.

8. The control method according to claim 1, wherein the learning of the control variable includes compensating for a noise introduced by a variation introduced by the process.

9. A non-transitory computer-readable recording medium on which is recorded program code executable by a computer to perform operations for controlling an internal combustion engine (Eng), the operations comprising:
   detecting whether a first condition is true, the first condition being that a process is being performed from among one or more verification and/or restoration processes, whose being performed inhibits an automatic stop of the internal combustion engine independently of an outcome of the same verification and/or restoration process; and learning a control variable of a component of said internal combustion engine only while the first condition is true such that the learning of the control variable is only performed while the first condition is true and the automatic stop of the internal combustion engine is thus inhibited;

wherein the one or more verification and/or restoration processes are selected from the group consisting of:
- verification of the activation of a vehicle air conditioner (AC),
- restoration of a particulate filter (FR),
- verification of the activation of a compressor for compressed air (CA),
- restoration of a drying cartridge of a compressor for compressed air (DR),
- verification of the activation of recharging means for vehicle batteries (BR),
- verification of the efficiency of a recharging system for vehicle batteries (BRE),
- verification of the activation of a warm up process of an exhaust line (ATSW),
- verification of the activation of a warm up process of the internal combustion engine (EW),
- verification of the opening of an engine bonnet (LO), and
- verification of the efficiency of electric propulsion systems (EE).

10. The non-transitory computer-readable recording medium according to claim 9, wherein the learning of the control variable is on a necessary condition that a second condition is true, the second condition being that the process has a running time greater than a running time of the learning of the control variable.

11. The non-transitory computer-readable recording medium according to claim 10, wherein the learning of the control variable is on a sufficient condition that the second condition is true.

12. The control method according to claim 10, wherein the learning of the control variable is on a further necessary condition that it is necessary to learn said control variable.

13. The non-transitory computer-readable recording medium according to claim 9, wherein the learning of the control variable is on a necessary condition that a second condition is true, the second condition being that the process includes absorbing a torque from the internal combustion engine within a predefined limit.

14. The non-transitory computer-readable recording medium according to claim 9, wherein the learning of the control variable is on a necessary condition that a second condition is true, the second condition being that the process includes introducing a variation fixed to a control parameter of the internal combustion engine within a predefined limit.

15. The non-transitory computer-readable recording medium according to claim 9, wherein the learning of the control variable includes limiting a torque absorbed by the internal combustion engine and/or a variation of a control parameter of the internal combustion engine introduced by the process.

16. The non-transitory computer-readable recording medium according to claim 9, wherein the learning of the control variable includes compensating for a noise introduced by a variation introduced by the process.

17. An apparatus comprising:
- the non-transitory computer-readable recording medium according to claim 9; and
- a computer for executing the program code.

18. An internal combustion engine integrating the apparatus according to claim 17.

19. A vehicle comprising the internal combustion engine according to claim 18.

* * * * *